(12) United States Patent
Yoon et al.

(10) Patent No.: US 7,897,720 B2
(45) Date of Patent: Mar. 1, 2011

(54) METHOD FOR REMOVING CATALYST RESIDUES FROM POLYMER SOLUTION AND POLYMERS PURIFIED BY THE METHOD

(75) Inventors: Sung-Cheol Yoon, Daejeon (KR); Hye-Young Jung, Daejeon (KR); Sung-Ho Chun, Daejeon (KR)

(73) Assignee: LG Chem, Ltd., Seoul (KR)

( * ) Notice: Subject to any disclaimer, the term of this patent is extended or adjusted under 35 U.S.C. 154(b) by 41 days.

(21) Appl. No.: 12/312,334

(22) PCT Filed: Nov. 7, 2007

(86) PCT No.: PCT/KR2007/005596
§ 371 (c)(1),
(2), (4) Date: May 6, 2009

(87) PCT Pub. No.: WO2008/056938
PCT Pub. Date: May 15, 2008

(65) Prior Publication Data
US 2010/0029900 A1    Feb. 4, 2010

(30) Foreign Application Priority Data
Nov. 7, 2006    (KR) .................. 10-2006-0109512

(51) Int. Cl.
*C08F 6/00*    (2006.01)
*C08C 1/14*    (2006.01)

(52) U.S. Cl. ......... 528/487; 502/150; 528/176; 528/190; 528/196; 528/271

(58) Field of Classification Search .................. 502/150; 528/176, 190, 196, 271, 487
See application file for complete search history.

(56) References Cited

U.S. PATENT DOCUMENTS

| | | | | |
|---|---|---|---|---|
| 3,672,942 | A | * | 6/1972 | Neumann ................. 427/295 |
| 5,073,621 | A | | 12/1991 | Tsiang |
| 5,104,972 | A | | 4/1992 | Madgavkar |
| 5,212,285 | A | | 5/1993 | Diaz et al. |
| 5,281,696 | A | | 1/1994 | Gibler |
| 6,222,008 | B1 | | 4/2001 | Gelles |
| 6,388,032 | B1 | | 5/2002 | Yamaura et al. |
| 7,015,293 | B2 | | 3/2006 | Oshima et al. |

FOREIGN PATENT DOCUMENTS

| | | |
|---|---|---|
| JP | 2004-307603 | 11/2004 |
| KR | 10-2001-0031145 | 4/2001 |
| KR | 10 2002-0057426 A | 7/2002 |
| KR | 10 2004-0080467 A | 9/2004 |
| KR | 10-2005-0012761 | 2/2005 |
| KR | 10-2006-0049922 | 5/2006 |

* cited by examiner

*Primary Examiner* — Terressa M Boykin

(57) ABSTRACT

Disclosed is a method for removing a metallic compound catalyst residue from a polymer solution which is prepared in the presence of a catalyst containing metal of Group 10 using a thiourea compound, a polymer from which the metallic compound catalyst residue is removed using the method, and a film produced using the method.

19 Claims, No Drawings

METHOD FOR REMOVING CATALYST RESIDUES FROM POLYMER SOLUTION AND POLYMERS PURIFIED BY THE METHOD

This application claims priority to PCT/KR2007/005596 filed on Nov. 7, 2007 along with Korean Patent Application No. 10-2006-0109512 filed on Nov. 7, 2006, both of which are hereby incorporated by reference in their entirety.

TECHNICAL FIELD

The present invention relates to a method for removing a metallic compound catalyst residue from a polymer solution, a polymer from which the metallic compound catalyst residue is removed using the method, and a film produced using the method.

This application claims priority from Korean Patent Application No. 10-2006-0109512 filed on Nov. 7, 2006 in the KIPO, the disclosure of which is incorporated herein by reference in its entirety.

BACKGROUND ART

Many studies have been conducted of high functional polymers that are capable of being applied to information and optical materials and catalysts used to produce the polymers. Novel transition metal catalysts have been studied to develop high-transparency and low-insulation cyclic olefin polymers (Makromol. Chem., Macromol. Symp., 1991, Vol. 47, 83; Angew. Makromol. Chem., 1994, Vol. 223, 121). Cyclic olefin polymers are produced using cyclic monomers such as norbornene and are applied to optical materials such as CDs, DVDs, and POFs (Plastic Optical Fiber), information electronic materials such as capacitor films and low dielectric materials, and medical materials such as low-absorption syringes and blister packaging due to excellent transparency, heat resistance, and resistance to chemicals, and very low birefringence and water absorption as compared to known olefin polymers.

Mitsui Chemistry, Co., Ltd., JSR, and Nippon Zeon, Co., Ltd. in Japan, Ticona, Co. in Germany, BFGoodrich, Co. in the United States and the like have commercialized cyclic olefin polymers such as PNB (Polynorbornene) and COC (Cyclic Olefin Copolymer) as high-transparency and low-insulation polymers late and applied them to information electronic, optical, and medical fields late in the year 1980s (U.S. Pat. No. 5,143,979; U.S. Pat. No. 5,191,026; Proceedings of MetCon'99 1999; EP Patent No. 156464; Modern Plastics, 1995, Vol. 72, 137; Proceedings of MetCon'98 1998).

The organometallic compound containing metal such as tungsten, molybdenum, ruthenium, nickel, and palladium is used as the reaction catalyst for cyclic olefin polymerization. The organometallic compound remains in the polymer after the polymerization reaction.

For example, U.S. Pat. No. 5,705,503 discloses ((Allyl)$PdCl)_2$/$AgSbF_6$ which is used as a catalyst to produce a norbornene polymer containing a polar functional group. In this connection, the amount of catalyst used is 1:100 to 1:250 based on monomers, which means that the catalyst is used in an excessive amount. Accordingly, catalyst residues remain in the resulting polymer in a large amount. Therefore, the polymer may deteriorate due to thermal oxidation and have reduced light transmittance.

Furthermore, Journal of American Chemical Society [J. Am. Chem. Soc. 1981, Vol. 103, 4627-4629] discloses polymerization of norbornene monomers having ester substituent groups using a cationic $[Pd(CH_3CN)_4][BF_4]_2$ catalyst. The polymerization has a low yield and exo isomers are selectively polymerized. Additionally, since the catalyst is used in an excessive amount of about 1/100 to 1/400 based on the monomer, there is a problem in that it is difficult to remove the catalyst residues after the polymerization.

The metallic catalyst compound remaining in the polymer generates a crack on the film during the production of the polymer film and reduces the transparency. Additionally, the high temperature is required to form polymer products. In this connection, since the polymer is discolored or decomposed at high temperatures due to the catalyst residue compounds, physical properties are significantly reduced. Therefore, a method for removing metallic compounds catalyst residue after the polymerization of the polymer has been suggested.

For example, U.S. Pat. No. 5,362,850 discloses a method for performing washing using alcohol in order to remove a catalyst which is contained in a polymer in an excessive amount when polyketone is produced using a palladium catalyst. However, the catalyst is inefficiently removed.

Furthermore, U.S. Pat. Nos. 5,231,164 and 5,750,772 disclose a method for using an inorganic filling material having a polar functional group. In the method, the inorganic filling material is added to the polymer solution so that the metallic catalyst compound contained in the polymer solution forms a chelate in conjunction with functional groups in the inorganic filling material, and only the inorganic filling material is filtered. In the method, it is easy to remove the metallic catalyst compound. However, the method cannot be used in practice due to the high-priced inorganic filling material having the polar functional group.

Additionally, Japanese Patent Application H 03-225290, and U.S. Pat. Nos. 5,462,995 and 5,990,246 disclose a method for removing catalyst residues from a polymer. Specifically, the polymer is a norbornene polymer, and it produced by performing ROMP (Ring Opening Metathesis Polymerization) using tungsten or ruthenium organometallic catalyst and then a hydrogenation reaction. In this case, the size of carrier of the heterogeneous catalyst used during the hydrogenation reaction may be controlled to remove catalyst residues from the polymer. However, the method for removing the catalyst residues is problematic in that it is difficult to control the removal of the catalyst residues and ensure commercialization.

Therefore, known technologies are problematic in that since high-priced inorganic filling materials are used or the removal effect of the catalyst residues is poor, processability is poor or it is difficult to ensure commercialization. Accordingly, there remains a need to develop a method for removing a high-quality optical polymer that is capable of avoiding the above-mentioned problems.

DISCLOSURE

Technical Problem

The present invention has been made keeping in mind the above problems occurring in the related art, and an object of the present invention is to provide a method for easily removing catalyst residues from a polymer of a polymer solution, which is prepared in the presence of a catalyst containing metal of Group 10, using a predetermined chelating agent to produce high-quality products using the polymer, a polymer purified using the method, and a film produced using the method.

Technical Solution

The present invention provides a method for removing a metallic compound catalyst residue from a polymer solution, which includes a) mixing a polymer solution which is prepared using a catalyst containing a metal of Group 10 and an organic thiourea compound to form a chelate compound of the organic thiourea compound and the metallic compound catalyst residue of the polymer solution, and b) adding the polymer solution containing the chelate compound formed therein to the polar solvent or adding the polar solvent to the polymer solution to dissolve the chelate compound while a polymer is precipitated and then filtered.

Furthermore, the present invention provides a method for removing a metallic compound catalyst residue from a polymer solution, which includes a) mixing a polymer solution which is prepared using a catalyst containing a metal of Group 10 and an organic thiourea compound to form a chelate compound of the organic thiourea compound and the metallic compound catalyst residue of the polymer solution, and b) adding a filtering agent to the polymer solution containing the chelate compound formed therein to filter the chelate compound.

Furthermore, the present invention provides a polymer which is purified using the method.

Furthermore, the present invention provides a film including the polymer.

Furthermore, the present invention provides a liquid crystal display, an optical device, a storage medium, and a packaging material including the film.

Advantageous Effects

A high-quality polymer is produced and a process cost is minimized using a method for removing a metallic compound catalyst residue from a polymer solution which is prepared in the presence of a catalyst containing metal of Group 10 according to the present invention. Thus, the polymer is commercially useful.

BEST MODE

Hereinafter, the present invention will be described in detail.

A method for removing a metallic compound catalyst residue from a polymer solution according to the present invention includes mixing a polymer solution which is prepared using a catalyst containing a metal of Group 10 and an organic thiourea compound to form a chelate compound of the organic thiourea compound with the metallic compound catalyst residue within the polymer solution, adding the polymer solution containing the chelate compound formed therein to the polar solvent or adding the polar solvent to the polymer solution to precipitate the polymer and dissolve the chelate compound for separation, and filtering the precipitated polymer. Therefore, the metallic compound catalyst residue can be removed from the polymer solution using the method.

Another method for removing a metallic compound catalyst residue from a polymer solution according to the present invention includes mixing a polymer solution which is prepared using a catalyst containing metal of Group 10 and an organic thiourea compound to form a chelate compound of the organic thiourea compound and the metallic compound catalyst residue of the polymer solution, and adding a filtering agent to filter the chelate compound. Therefore, the metallic compound catalyst residue can be removed from the polymer solution using the method.

The organic thiourea compound which is used in the present invention may act as a chelating agent that is reacted with the catalyst metallic compound remaining in the polymerization solution to form the chelate compound. In addition, the organic thiourea compound, while being dissolved in a small amount of polar solvent, may be mixed with the polymer solution which is dissolved in a nonpolar solvent. Examples of the polar solvent which dissolves the organic thiourea compound include, but are not limited to, water, alcohol, acetone, ethylene glycol, and glycerol In general, the chelating agent is a compound that includes two or more unshared electron pairs and forms a stable chelate ring in conjunction with metal ions to prevent the occurrence of undesirable chemical reactions of the metal ions. Frequently used a polymerization catalyst containing metal ions is a $Pd^{2+}$ catalyst that is coordinated with organic ligands and is a divalent oxidation number. The catalyst is ready to remain in the polymer solution. However, the catalyst residues are reduced from $Pd^{2+}$ having a divalent oxidation number to $Pd^0$ having a zero-valent oxidation number in the polymer solution to perform coloration or reduced $Pd^0$ has poor solubility. Accordingly, it is difficult to remove reduced $Pd^0$ by washing using a solvent. In order to avoid this, a chelating agent which is capable of being efficiently bonded to the $Pd^{2+}$ compound before the $Pd^{2+}$ compound is reduced may be used to prevent the reduction reaction. Thereby, the $Pd^{2+}$ compound is efficiently removed by washing using the solvent.

Preferably, examples of the organic thiourea compound according to the present invention include a compound represented by the following Formula 1, but are not limited thereto.

[Formula 1]

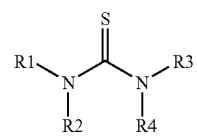

wherein R1, R2, R3, and R4 are each independently any one selected from the group consisting of hydrogen; halogen; linear or branched alkyl that has 1 to 20 carbon atoms and is substituted or unsubstituted with one or more substituent groups selected from the group consisting of halogen, alkyl, alkenyl, alkynyl, haloalkyl, haloalkenyl, and haloalkynyl; linear or branched alkenyl that has 2 to 20 carbon atoms and is substituted or unsubstituted with one or more substituent groups selected from the group consisting of halogen, alkyl, alkenyl, alkynyl, haloalkyl, haloalkenyl, and haloalkynyl; linear or branched alkynyl that has 2 to 20 carbon atoms and is substituted or unsubstituted with one or more substituent groups selected from the group consisting of halogen, alkyl, alkenyl, alkynyl, haloalkyl, haloalkenyl, and haloalkynyl; cycloalkyl that has 3 to 12 carbon atoms and is substituted or unsubstituted with one or more substituent groups selected from the group consisting of halogen, alkyl, alkenyl, alkynyl, haloalkyl, haloalkenyl, and haloalkynyl; aryl that has 6 to 40 carbon atoms and is substituted or unsubstituted with one or more substituent groups selected from the group consisting of halogen, alkyl, alkenyl, alkynyl, haloalkyl, haloalkenyl, and haloalkynyl; aralkyl that has 7 to 15 carbon atoms and is substituted or unsubstituted with one or more substituent groups selected from the group consisting of halogen, alkyl, alkenyl, alkynyl, haloalkyl, haloalkenyl, and haloalkynyl;

alkoxy or aminoalkyl containing oxygen and nitrogen atoms; and an amine group containing an alkyl group or an aryl group.

Preferably, the organic thiourea compound includes one or more selected from the group consisting of 1-methyl-2-thiourea, 1-ethyl-2-thiourea, 1-allyl-2-thiourea, 1,3-dimethyl-2-thiourea, 1,3-dimethyl-thiourea, 1,3-diisopropyl-thiourea, 1,3-dibutyl-2-thiourea, 1-methylallyl-3-methyl-2-thiourea, 1-cyclohexyl-3-(2-morpholinoethyl)-2-thiourea, 1-acetyl-2-thiourea, 1-phenyl-2-thiourea, 1-(2-chlorophenyl)-2-thiourea, 1-(3,4-dichlorophenyl)-2-thiourea, 1-(2-methoxyphenyl)-2-thiourea, 1-(4-methoxyphenyl)-2-thiourea, 1-benzyl-3-methyl-2-thiourea, 1,3-di-o-tolyl-2-thiourea, 3-di-p-tolyl-2-thiourea, thiosemicarbazide, 2-methyl-3-thiosemicarbazide, 4-methyl-3-thiosemicarbazide, 4-ethyl-3-thiosemicarbazide, 4,4-dimethyl-3-thiosemicarbazide, 4-allyl-3-thiocarbazide, thiocarbanilide, 4-phenyl-3-thiosemicarbazide, and diphenylthiosemicarbazide.

More preferably, the organic thiourea compound includes one or more selected from the group consisting of 1-methyl-2-thiourea, 1-ethyl-2-thiourea, 1,3-dimethyl-2-thiourea, 1,3-dimethyl-thiourea, 1,3-diisopropyl-thiourea, 1,3-dibutyl-2-thiourea, 1-acetyl-2-thiourea, 1-phenyl-2-thiourea; 1-(2-chlorophenyl)-2-thiourea, 1-(3,4-dichlorophenyl)-2-thiourea, 1-benzyl-3-methyl-2-thiourea, 1,3-di-o-tolyl-2-thiourea, and 3-di-p-tolyl-2-thiourea which have excellent solubility in respects to the organic solvent.

Additionally, the organic thiourea compound of step a) may be used in an amount of 0.001 to 1% by weight based on a weight of polymer. In this connection, if the amount is less than 0.001% by weight, it is difficult to remove metal residues. If the amount is more than 1% by weight, since the organic thiourea compound is incorporated in the polymer, there is a disadvantage in that physical properties of the polymer may be deteriorated. Furthermore, it is more preferable that the organic thiourea compound be used in an amount of 0.01 to 0.1% by weight based on a weight of the polymer.

Preferably, the polymer which is produced using the catalyst containing the metal of Group 10 used in the present invention is used as the cyclic olefin polymer.

The cyclic olefin polymer may be a polymer containing a norbornene monomer represented by the following Formula 2, but is not limited thereto.

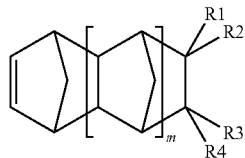

[Formula 2]

wherein m is an integer in the range of 0 to 4,

R1, R2, R3, and R4 are hydrogen; halogen; linear or branched alkyl that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, haloarbonyloxy, aryloxy, haloaryloxy, silyl, and siloxy; linear or branched alkynyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that includes at least one of oxygen, nitrogen, phosphorus, sulfur, silicon, and boron, and R1 and R2 or R3 and R4 may be bonded to each other to form an alkylidene group having 1 to 10 carbon atoms or R1 or R2 may be bonded to any one of R3 and R4 to form a saturated or unsaturated aliphatic ring having 4 to 12 carbon atoms or an aromatic ring having 6 to 24 carbon atoms, with a proviso that R1, R2, R3, and R4 are not hydrogen, halogen, or the polar functional group.

Specifically, examples of the polar functional group may include —$R_5OR_6$, —$OR_6$, —$OC(O)OR_6$, —$R_5OC(O)OR_6$, —$C(O)OR_6$, —$C(O)OR_6$, —$C(O)R_6$, —$R_5C(O)R_6$, —$OC(O)R_6$, —$R_5OC(O)R_6$, —$(R_5O)_p$—$OR_6$, —$(OR_5)_p$—, —$C(O)$—$O$—$C(O)R_6$, —$R_5C(O)$—$O$—$C(O)R_6$, —$SR_6$, —$R_5SR_6$, —$SSR_6$, —$R_5SSR_6$, —$S(=O)R_6$, —$R_5S(=O)R_6$, —$R_5C(=S)R_6$—, —$R_5C(=S)SR_6$, —$R_5SO_3R_6$, —$SO_3R_6$, —$R_5N=C=S$, —$N=C=S$, —$NCO$, —$R_5$—$NCO$, —$CN$, —$R_5CN$, —$NNC(=S)R_6$, —$R_5NNC(=S)R_6$, —$NO_2$, —$R_5NO_2$,

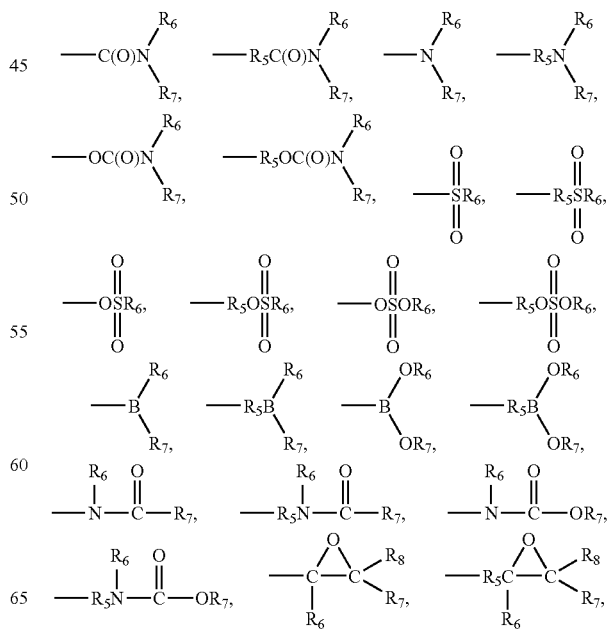

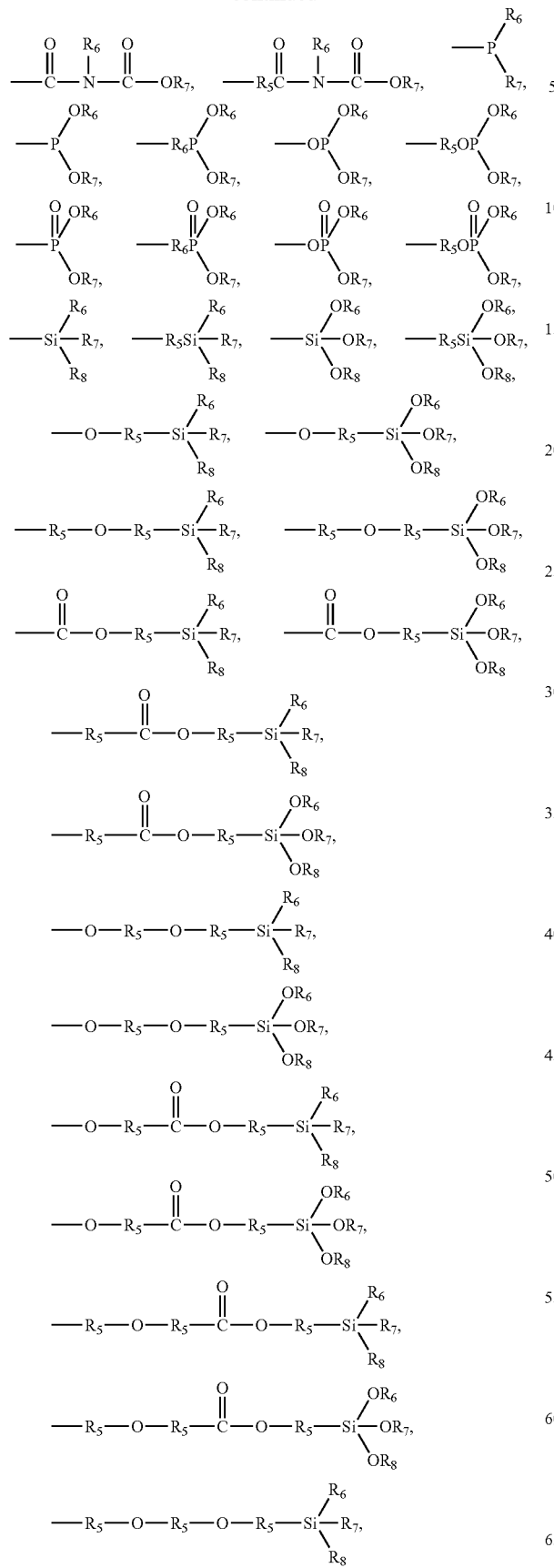
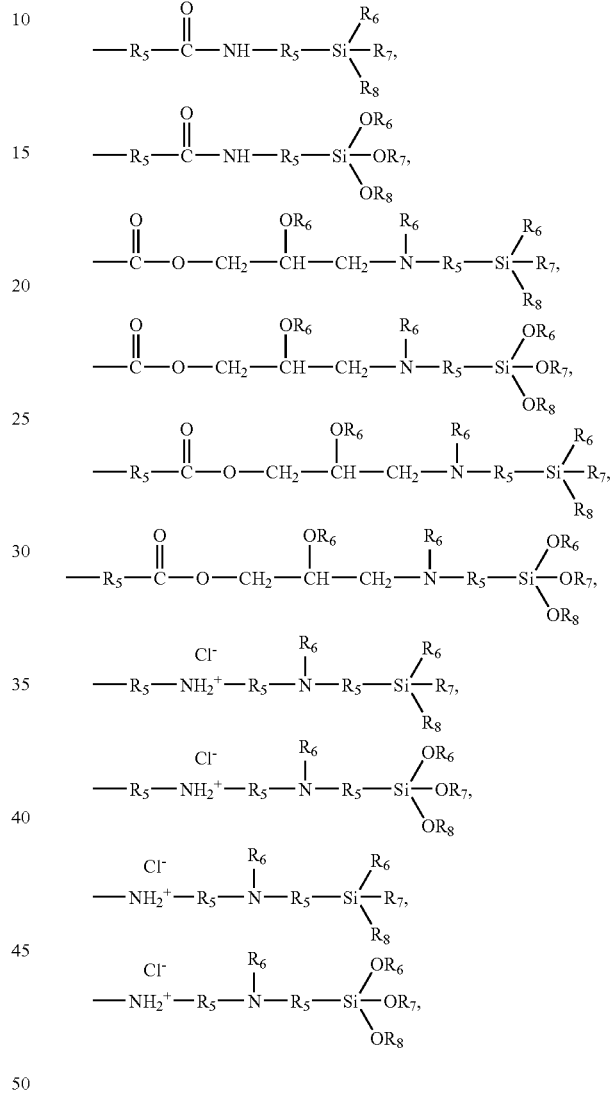

wherein $R_5$ is linear or branched alkylene that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenylene that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynylene that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkylene that has 3 to 12 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; arylene that has 6 to 40 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxylene that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxylene that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy, $R_5$s are the same as or different from each other with the proviso that two or more $R_5$s are present, and $R_6$, $R_7$, and $R_8$ are the same as or different from each other, and hydrogen; halogen; linear or branched alkyl that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; alkoxy that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or carbonyloxy that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy.

In the method for removing the metallic compound catalyst residue from the polymer solution according to the present invention, the metallic compound catalyst residue can be efficiently removed even though at least one of R1 to R4 of Formula 1 is the polar functional group.

The cyclic olefin polymer may be produced using a process known in the related art. Specifically, the cyclic olefin polymer may be produced using an addition polymerization in the presence of a catalyst system that includes a catalyst mixture having 1) a precatalyst containing metal of Group 10 and 2) a cocatalyst containing salt compounds having phosphonium, but the production process of the polymer is not limited thereto.

The metal of Group 10 contains Ni, Pd, Pt or the like, and preferably Pd and Pt.

Examples of the precatalyst containing the metal of Group 10 include a compound represented by the following Formula 3, but are not limited thereto.

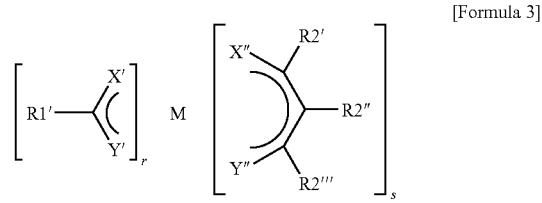

[Formula 3]

wherein X', X", Y', and Y" are each independently a hetero atom selected from the group consisting of S and O, R1', R2', R2" and R2''' are each independently substituted or unsubstituted and linear or branched alkyl having 1 to 20 carbon atoms; substituted or unsubstituted and linear or branched alkenyl having 2 to 20 carbon atoms; substituted or unsubstituted alkynyl having 2 to 20 carbon atoms; substituted or unsubstituted cycloalkyl having 3 to 12 carbon atoms; substituted or unsubstituted aryl having 6 to 40 carbon atoms; or substituted or unsubstituted aralkyl having 7 to 15 carbon atoms, M is metal of Group 10, and r and s are each independently in the range of 0 to 2 and r+s is 2.

Furthermore, examples of the cocatalyst containing the salt compounds having phosphonium include a compound represented by the following Formula 4, but are not limited thereto.

[H—P(R3')₃][Ani]   [Formula 4]

wherein R3' is hydrogen; linear or branched alkyl or alkoxy having 1 to 20 carbon atoms; linear or branched alkenyl having 2 to 20 carbon atoms; alkynyl having 2 to 20 carbon atoms; cycloalkyl that has 3 to 12 carbon atoms and is substituted or unsubstituted with haloalkyl having 1 to 20 carbon atoms; aryl that has 6 to 40 carbon atoms and is substituted or unsubstituted with haloalkyl having 1 to 20 carbon atoms; or aralkyl that has 7 to 15 carbon atoms and is substituted or unsubstituted with haloalkyl having 1 to 20 carbon atoms, and R3's may be the same as or different from each other with the proviso that two or more R3's are present, and

[Ani] is an anion which is weakly coordinated with metal of Formula 3, and any one selected from the group consisting of borate, aluminate, [SbF₆]—, [PF₆]—, [AsF₆]—, perfluoroacetate ([CF₃CO₂]—), perfluoropropionate ([C₂F₅CO₂]—), perfluorobutyrate ([CF₃CF₂CF₂CO₂]—), perchlorate ([ClO$_4$]—), p-toluenesulfonate ([p-CH$_3$C$_6$H$_4$SO$_3$]—), [SO$_3$CF$_3$]—, boratabenzene, and carborane which is substituted or unsubstituted with halogen.

In the specification, the term "substituted or unsubstituted" means that it is substituted with halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy or it is unsubstituted.

In the specification, alkenyl includes vinyl and allyl.

The polymer solution according to the present invention may be a polymer solution containing a polymer dissolved in one or more solvents selected from the group consisting of dichloromethane, dichloroethane, toluene, and chlorobenzene solvents, but is not limited thereto.

In the method for removing the metallic compound catalyst residue from the polymer solution according to the present invention, it is preferable that an amount of the polymer of the polymer solution in step a) be 2 to 50% by weight. In this connection, if the amount of the polymer is less than 2% by weight, since the amount of solvent used during the precipitation process of the polymer is increased, processability and economic efficiency are deteriorated. If the amount is more than 50% by weight, since viscosity of the solution is increased, the polymer is difficult to efficiently form a chelate in conjunction with the organometallic compound. It is preferable that the amount of the polymer of the polymer solution be 5 to 20% by weight.

In the method for removing the metallic compound catalyst residue from the polymer solution according to the present invention, preferably, in respects to the reaction condition, when the amount of the polymer of the polymer solution is 2 to 50% by weight, the reaction temperature is in the range of 20 to 150° C., the agitation speed is in the range of 100 to 1000 rpm, the reaction time is in the range of 1 to 18 hours, and the amount of the organic thiourea compound is 0.001 to 1% by weight based on the weight of the polymer.

In addition, before the organic thiourea solution is added to the polymer solution of step a, a small amount of acid may be added to the polymer solution. The small amount of acid may separate the polymer from the organometallic catalyst during the polymerization in the presence of the catalyst and may make it easier for the separated organometallic catalyst with the organic thiourea compound. Any one or mixtures of two or more species selected from organic acids consisting of a hydrochloric acid, a sulfuric acid, and a p-toluenesulfonic acid may be used as the acid, and the acid may be used in an amount of 0.001 to 1% by weight based on the weight of the polymer.

In the method for removing the metallic compound catalyst residue from the polymer solution according to the present invention, the polar solvent used during step b) is used to precipitate the polymer and it is preferable to use a solvent that has an excellent precipitation effect and is capable of dissolving the metal catalyst chelate compound as the polar solvent. Examples of the polar solvent may include one or more selected from the group consisting of water, alcohol, acetone, ethylene glycol, and glycerol. Of them, alcohol solvents such as methanol, ethanol, and isopropanol are preferable. A method for filtering the precipitated polymer is not limited. For example, the filtration is performed using a paper filter to easily separate the polymer from the metal catalyst chelate compound.

In the method for removing the metallic compound catalyst residue from the polymer solution according to the present invention, the used filtering agent functions to increase a filtering effect, and examples of the filtering agent may include one or more selected from the group consisting of diatomite, cellulose, kaolin, kaolite, silica gel, and zeolite. The filtering agent may be used in an amount of 0.01 to 10% by weight based on the weight of the polymer.

In the method for removing the metallic compound catalyst residue from the polymer solution according to the present invention, the filtering of the chelate compound may be performed in a continuous or batch reactor under pressure or using centrifugal separation, but is not limited thereto.

The method may include passing the polymer solution through a column containing an adsorbing agent charged therein or adding a predetermined amount of adsorbing agent to a predetermined amount of polymer solution to remove the catalyst and inorganic substances other than the metal compound of the cocatalyst which remain in the polymer solution obtained using filtering of the chelate compound.

The polar solvent may be added to the polymer solution to precipitate the polymer and perform filtering, thus preparing the purified polymer.

The present invention provides a polymer which is purified using the method for removing the metallic compound catalyst residue from the polymer solution and a transparent film produced using the polymer. The amount of the catalyst residues contained in the polymer produced according to the present invention is 10 ppm or less, which does not affect light transmittance of the film produced using the polymer. Specifically, the polymer solution which is purified using the method for removing the metallic compound catalyst residue is applied on the substrate, and the solvent is removed to produce the film. However, the production procedure of the film is not limited thereto.

Furthermore, the film according to the present invention may be applied to liquid crystal displays, optical devices, storage media, packaging material or the like. In particular, the film which is produced using the cyclic olefin addition polymer according to the present invention, for example, optical anisotropic film, may be used as an optical compensation film for various types of LCDs (Liquid crystal display), and retardation and protective films of polarizing plates for LCDs. This is because a thickness refractive index required in the optical anisotropic film may be adjusted according to the type and the amount of the functional group provided in the cyclic olefin addition polymer.

MODE FOR INVENTION

Hereinafter, the present invention will be described in detail in light of Examples and Experimental Examples. The present invention may, however, be embodied in many different forms and should not be construed as being limited to the Examples and Experimental Examples set forth herein. Rather, these Examples and Experimental Examples are provided such that this disclosure will be thorough and complete and will fully convey the concept of the present invention to those skilled in the art.

Preparation Example 1

Preparation of 5-norbornene-2-methyl Acetate Polymer Solution

The 5-norbornene-2-methyl acetate monomer (100 g, 601.6 mmol) and toluene (300 g) were charged in a 1 L Schlenk flask, the solution containing Pd(OAc)$_2$ (9.02 mg, 40.2 μmol) and [HP(Cy)$_3$][B(C$_6$F$_5$)$_4$] (77.2 mg, 80.4 μmol) dissolved in dichloromethane (2 ml) was added thereto as the catalyst, and the reaction was performed while the mixture was agitated at 90° C. for 18 hours. After 18 hours, 200 g of toluene was added and the agitation was performed at normal temperature to prepare a polymer solution.

Example 1

Removal of Catalyst Residues Using the 2-acetyl-2-thiourea Compound 30 g of polymer solution prepared in Preparation Example 1 was provided in the 3 L batch reactor under a nitrogen atmosphere and agitated at normal temperature at an agitation speed of 500 rpm. 1 g of 0.5 wt % solution containing 2-acetyl-2-thiourea dissolved in the ethanol solvent was added to the polymer solution and agitated at 80° C. for 2 hours. The polymer solution was cooled and then added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Example 2

Removal of Catalyst Residues Using the 2-acetyl-2-thiourea Compound in the Presence of HCl 30 g of polymer solution prepared in Preparation Example 1 was provided in the 3 L batch reactor under a nitrogen atmosphere and agitated at normal temperature at an agitation speed of 500 rpm. 0.1 g of 4 wt % HCl solution prepared using the ethanol solvent was added thereto and then agitated at normal temperature. After the agitation was performed for about 1 hour, 1 g of 0.5 wt % solution containing 2-acetyl-2-thiourea dissolved in the ethanol solvent was added to the polymer solution and additionally agitated at 80° C. for 2 hours. The polymer solution was cooled and then added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Example 3

Removal of Catalyst Residues Using the Benzylthiourea Compound 30 g of polymer solution prepared in Preparation Example 1 was provided in the 3 L batch reactor under a nitrogen atmosphere and agitated at normal temperature at an agitation speed of 500 rpm. 1 g of 0.7 wt % solution containing benzylthiourea dissolved in the ethanol solvent was added to the polymer solution and agitated at 80° C. for 2 hours. The polymer solution was cooled and then added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Example 4

Removal of Catalyst Residues Using the Benzylthiourea Compound in the Presence of HCl 30 g of polymer solution prepared in Preparation Example 1 was provided in the 3 L batch reactor under a nitrogen atmosphere and agitated at normal temperature at an agitation speed of 500 rpm. 0.1 g of 4 wt % HCl solution prepared using the ethanol solvent was added thereto and then agitated at normal temperature. After the agitation was performed for about 1 hour, 1 g of 0.7 wt % solution containing benzylthiourea dissolved in the ethanol solvent was added to the polymer solution and additionally agitated at 80° C. for 2 hours. The polymer solution was cooled and then added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Comparative Example 1

Removal of Catalyst Residues without Using the Chelating Agent 30 g of polymer solution prepared in Preparation Example 1 was provided in the 3 L batch reactor under a nitrogen atmosphere and agitated at normal temperature at an agitation speed of 500 rpm. 0.1 g of 4 wt % HCl solution prepared using the ethanol solvent was added thereto and then agitated at normal temperature. After the agitation was performed for about 1 hour, the resulting solution was added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Comparative Example 2

Removal of Catalyst Residues without Using the Chelating Agent 30 g of polymer solution prepared in Preparation Example 1 was provided in the 3 L batch reactor under a nitrogen atmosphere and agitated at normal temperature at an agitation speed of 500 rpm. 0.1 g of 4 wt % HCl solution prepared using the ethanol solvent was added thereto and then agitated at normal temperature. After the agitation was performed for about 1 hour, the resulting solution was added to the hexane solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Comparative Example 3

Removal of Catalyst Residues Using the Hydroxy Chelating Agent 30 g of polymer solution prepared in Preparation Example 1 was provided in the 3 L batch reactor under a nitrogen atmosphere and agitated at normal temperature at an agitation speed of 500 rpm. 1 g of 0.5 wt % solution prepared using the malic acid dissolved in purified water was added thereto and then agitated at normal temperature. After the agitation was performed for about 1 hour, the resulting solution was added to the ethanol solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Comparative Example 4

Removal of Catalyst Residues Using the Ion-Exchange Resin 30 g of polymer solution prepared in Preparation Example 1 was provided in the 3 L batch reactor under a nitrogen atmosphere and agitated at normal temperature at an agitation speed of 500 rpm. 1 g of strong acid ion-exchange resin (amberlite IR-120) was added to the polymer solution, agitated for about 1 hour, and filtered. The filtered substance was added to the hexane solvent to precipitate the polymer. The precipitated polymer was filtered using the paper filter and dried at 70° C. under reduced pressure for 18 hours, and the amount of the catalyst residue compound remaining in the polymer was measured. The results are described in the following Table 1.

Experimental Example 1

Measurement of Catalyst Residues Contained in the Cyclic Olefin Polymer

The amount of Pd which was contained in the polymer powder obtained after the drying was measured using the ICP (Inductively Coupled Plasma) emission spectrometer for inorganic element quantitative analysis. Perkin Elmer Optima 5300DV was used as the ICP emission spectrometer. The analysis results are described in the following Table 1.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Amount of catalyst residues (ppm) | 5 | 4 | 6 | 5 | 20 | 36 | 25 | 30 |

From Table 1, it can be seen that the amount of catalyst residues is significantly reduced in Examples using the organic thiourea compound as the chelating agent according to the present invention, in comparison with Comparative Examples in which the chelating agent is not used or the hydroxy chelating agent or other inorganic chelating agents are used.

The invention claimed is:

1. A method for removing a metallic compound catalyst residue from a polymer solution, comprising the steps of:
   a) mixing a polymer solution, which is prepared using a catalyst containing a metal of Group 10, and an organic thiourea compound as represented by Formula 1 to form a chelate compound of the organic thiourea compound with the metallic compound catalyst residue within the polymer solution; and
   b) adding the polymer solution containing the chelate compound formed therein to a polar solvent, adding the polar solvent to the polymer solution to dissolve the chelate compound while a polymer is precipitated and then filtered; or adding a filtering agent to the polymer solution containing the chelate compound therein to filter the chelate compound,
   wherein the method further comprises adding an acid to the polymer solution before the thiourea compound is added during step a),

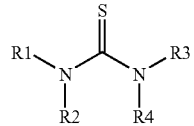

[Formula 1]

wherein R1, R2, R3, and R4 are each independently any one selected from the group consisting of hydrogen; halogen; linear or branched alkyl that has 1 to 20 carbon atoms and is substituted or unsubstituted with one or more substituent groups selected from the group consisting of halogen, alkyl, alkenyl, alkynyl, haloalkyl, haloalkenyl, and haloalkynyl; linear or branched alkenyl that has 2 to 20 carbon atoms and is substituted or unsubstituted with one or more substituent groups selected from the group consisting of halogen, alkyl, alkenyl, alkynyl, haloalkyl, haloalkenyl, and haloalkynyl; linear or branched alkynyl that has 2 to 20 carbon atoms and is substituted or unsubstituted with one or more substituent groups selected from the group consisting of halogen, alkyl, alkenyl, alkynyl, haloalkyl, haloalkenyl, and haloalkynyl; cycloalkyl that has 3 to 12 carbon atoms and is substituted or unsubstituted with one or more substituent groups selected from the group consisting of halogen, alkyl, alkenyl, alkynyl, haloalkyl, haloalkenyl, and haloalkynyl; aryl that has 6 to 40 carbon atoms and is substituted or unsubstituted with one or more substituent groups selected from the group consisting of halogen, alkyl, alkenyl, alkynyl, haloalkyl, haloalkenyl, and haloalkynyl; aralkyl that has 7 to 15 carbon atoms and is substituted or unsubstituted with one or more substituent groups selected from the group consisting of halogen, alkyl, alkenyl, alkynyl, haloalkyl, haloalkenyl, and haloalkynyl; alkoxy or aminoalkyl containing oxygen and nitrogen atoms; and an amine group containing an alkyl group or an aryl group.

2. The method for removing a metallic compound catalyst residue from a polymer solution according to claim 1, wherein the organic thiourea compound comprises at least one selected from the group consisting of 1-methyl-2-thiourea, 1-ethyl-2-thiourea, 1-allyl-2-thiourea, 1,3-dimethyl-2-thiourea, 1,3-dimethyl-thiourea, 1,3-diisopropyl-thiourea, 1,3-dibutyl-2-thiourea, 1-methylallyl-3-methyl-2-thiourea, 1-cyclohexyl-3-(2-morpholinoethyl)-2-thiourea, 1-acetyl-2-thiourea, 1-phenyl-2-thiourea, 1-(2-chlorophenyl)-2-thiourea, 1-(3,4-dichlorophenyl)-2-thiourea, 1-(2-methoxyphenyl)-2-thiourea, 1-(4-methoxyphenyl)-2-thiourea, 1-benzyl-3-methyl-2-thiourea, 1,3-di-o-tolyl-2-thiourea, 3-di-p-tolyl-2-thiourea, thiosemicarbazide, 2-methyl-3-thiosemicarbazide, 4-methyl-3-thiosemicarbazide, 4-ethyl-3-thiosemicarbazide, 4,4-dimethyl-3-thiosemicarbazide, 4-allyl-3-thiocarbazide, thiocarbanilide, 4-phenyl-3-thiosemicarbazide, and diphenylthiosemicarbazide.

3. The method for removing a metallic compound catalyst residue from a polymer solution according to claim 1, wherein an amount of the organic thiourea compound used during step a) is 0.001 to 1% by weight based on a weight of the polymer.

4. The method for removing a metallic compound catalyst residue from a polymer solution according to claim 1, wherein the polymer prepared using the catalyst containing the metal of Group 10 is a cyclic olefin polymer.

5. The method for removing a metallic compound catalyst residue from a polymer solution according to claim 4, wherein the cyclic olefin polymer comprises a norbornene monomer represented by Formula 2:

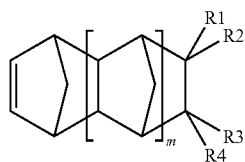

[Formula 2]

wherein m is an integer in the range of 0 to 4,

R1, R2, R3, and R4 are hydrogen; halogen; linear or branched alkyl that has 1 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkenyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; linear or branched alkynyl that has 2 to 20 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; cycloalkyl that has 3 to 12 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; aryl that has 6 to 40 carbon atoms and is substituted or unsubstituted with one or more substituent groups selected from the group consisting of halogen, alkyl, alkenyl, alkynyl, haloalkyl, haloalkenyl, haloalkynyl, aryl, haloaryl, aralkyl, haloaralkyl, alkoxy, haloalkoxy, carbonyloxy, halocarbonyloxy, aryloxy, haloaryloxy, silyl, and siloxy; or a polar functional group that includes at least one of oxygen, nitrogen, phosphorus, sulfur, silicon, and boron, and R1 and R2 or R3 and R4 may be bonded to each other to form an alkylidene group having 1 to 10 carbon atoms or R1 or R2 may be bonded to any one of R3 and R4 to form a saturated or unsaturated aliphatic ring having 4 to 12 carbon atoms or an aromatic ring having 6 to 24 carbon atoms, with a proviso that R1, R2, R3, and R4 are not hydrogen, halogen, or the polar functional group.

6. The method for removing a metallic compound catalyst residue from a polymer solution according to claim 5, wherein at least one of R1 to R4 in Formula 1 comprises the polar functional group.

7. The method for removing a metallic compound catalyst residue from a polymer solution according to claim 1, wherein an amount of the polymer of the polymer solution in step a) is 2 to 50% by weight.

8. The method for removing a metallic compound catalyst residue from a polymer solution according to claim 1, wherein the polar solvent of step b) comprises at least one selected from the group consisting of water, alcohol, acetone, ethylene glycol, and glycerol.

9. The method for removing a metallic compound catalyst residue from a polymer solution according to claim 1, wherein the filtering agent used during step b) comprises at least one selected from the group consisting of diatomite, cellulose, kaolin, silica gel, and zeolite.

10. The method for removing a metallic compound catalyst residue from a polymer solution according to claim 9, wherein an amount of the filtering agent used is 0.01 to 10% by weight based on a weight of the polymer.

11. The method for removing a metallic compound catalyst residue from a polymer solution according to claim 1, wherein upon adding a filtering agent, under step b), to the polymer solution containing the chelate compound therein to filter the chelate compound, further comprising adding the polar solvent to the polymer solution after step b) to precipitate and filter the polymer.

12. The method for removing a metallic compound catalyst residue from a polymer solution according to claim 1, wherein the metal of Group 10 comprises at least one selected from the group consisting of Ni, Pd, and Pt.

13. The method for removing a metallic compound catalyst residue from a polymer solution according to claim 1, wherein the catalyst containing the metal of Group 10 comprises a compound represented by Formula 3:

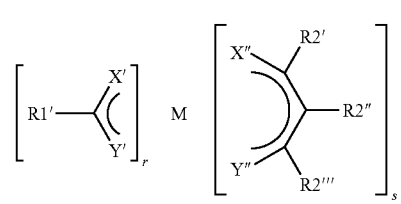

[Formula 3]

wherein X', X", Y', and Y" are each independently a hetero atom selected from the group consisting of S and O, R1', R2', R2" and R2'" are each independently substituted or unsubstituted and linear or branched alkyl having 1 to 20 carbon atoms; substituted or unsubstituted and linear or branched alkenyl having 2 to 20 carbon atoms; substituted or unsubstituted alkynyl having 2 to 20 carbon atoms; substituted or unsubstituted cycloalkyl having 3 to 12 carbon atoms; substituted or unsubstituted aryl having 6 to 40 carbon atoms; or substituted or unsubstituted aralkyl having 7 to 15 carbon atoms, M is a metal of Group 10, and r and s are each independently in the range of 0 to 2 and r+s is 2.

14. A polymer which is purified using the method of claim 1 and has catalyst residues in an amount of 10 ppm or less.

15. A film which is produced using the polymer of claim 13.

16. A liquid crystal display comprising the film of claim 15.

17. An optical device comprising the film of claim 15.

18. The method for removing a metallic compound catalyst residue from a polymer solution according to claim 1, wherein an amount of the acid added the polymer solution is 0.001 to 1% by weight based on the weight of the polymer.

19. The method for removing a metallic compound catalyst residue from a polymer solution according to claim 1, wherein the acid is at least one selected from the group consisting of hydrochloric acid, sulfuric acid, and p-toluene sulfonic acid.

* * * * *